(12) United States Patent
Kaneda et al.

(10) Patent No.: US 6,675,549 B1
(45) Date of Patent: Jan. 13, 2004

(54) PROCESSING MACHINE INSTALLATION

(75) Inventors: Kiyoshi Kaneda, Kanagawa (JP); Toshiyuki Kusakari, Kanagawa (JP)

(73) Assignee: Makino Milling Machine Co., LTD, Tokyo (JP)

(*) Notice: Subject to any disclaimer, the term of this patent is extended or adjusted under 35 U.S.C. 154(b) by 111 days.

(21) Appl. No.: 09/970,129

(22) Filed: Oct. 3, 2001

(30) Foreign Application Priority Data

| Oct. 4, 2000 | (JP) | 2000-305420 |
| Oct. 27, 2000 | (JP) | 2000-329529 |
| Jun. 11, 2001 | (JP) | 2001-175945 |

(51) Int. Cl.[7] .............................................. E04D 15/00
(52) U.S. Cl. .................. 52/749.1; 52/741.1; 52/745.19; 409/135
(58) Field of Search ............................ 52/741.1, 749.1, 52/745.19, 747.1; 409/135

(56) References Cited

U.S. PATENT DOCUMENTS

| 2,221,127 A | * | 11/1940 | Bates | 90/1 |
| 2,282,210 A | * | 5/1942 | Plum | 98/33 |
| 3,859,812 A | * | 1/1975 | Pavlak | 62/119 |
| 4,310,963 A | * | 1/1982 | Blumle | 156/305 |
| 4,540,118 A | * | 9/1985 | Lortie et al. | 165/226 |
| 4,651,404 A | * | 3/1987 | Shorrock | 29/563 |
| 4,893,971 A | * | 1/1990 | Watanabe et al. | 409/80 |
| 5,146,977 A | * | 9/1992 | Kiser | 165/229 |
| 5,213,019 A | * | 5/1993 | Carlyle et al. | 384/900 |
| 5,438,178 A | * | 8/1995 | Buhler et al. | 219/69.12 |
| 5,495,721 A | * | 3/1996 | Stueble | 62/121 |
| 5,997,223 A | * | 12/1999 | Kosmowski | 408/124 |
| 6,473,951 B1 | * | 11/2002 | Nakaminami et al. | 29/27 R |

FOREIGN PATENT DOCUMENTS

DE    DD 147 518 A    4/1981

OTHER PUBLICATIONS

Patent Abstracts of Japan vol. 12, No. 400 Oct. 24, 1988.

* cited by examiner

*Primary Examiner*—Carl D. Friedman
*Assistant Examiner*—Steve Varner
(74) *Attorney, Agent, or Firm*—Paul & Paul

(57) ABSTRACT

A processing machine installation is provided with a processing machine having a tool for machining a workpiece, heat-generating potions and non-heat-generating portions, a first cover for defining a air conditioned processing machine room around the processing machine, an air injector including a plurality of air outlet, provided in the first cover, for directing air to the respective portions of the processing machine, the air outlet being distributed depending on the amount of heat generated in the respective portions of the processing machine so that the air flow through the air outlet portions are adjusted to substantially level the temperature of the respective portions of the processing machine an air conditioner for controlling the temperature rate of the air supplied to the air injector he basis of the air temperature in the air conditioned processing machine room. The air temperature in the air conditioned processing machine room is controlled to a desired temperature.

11 Claims, 9 Drawing Sheets

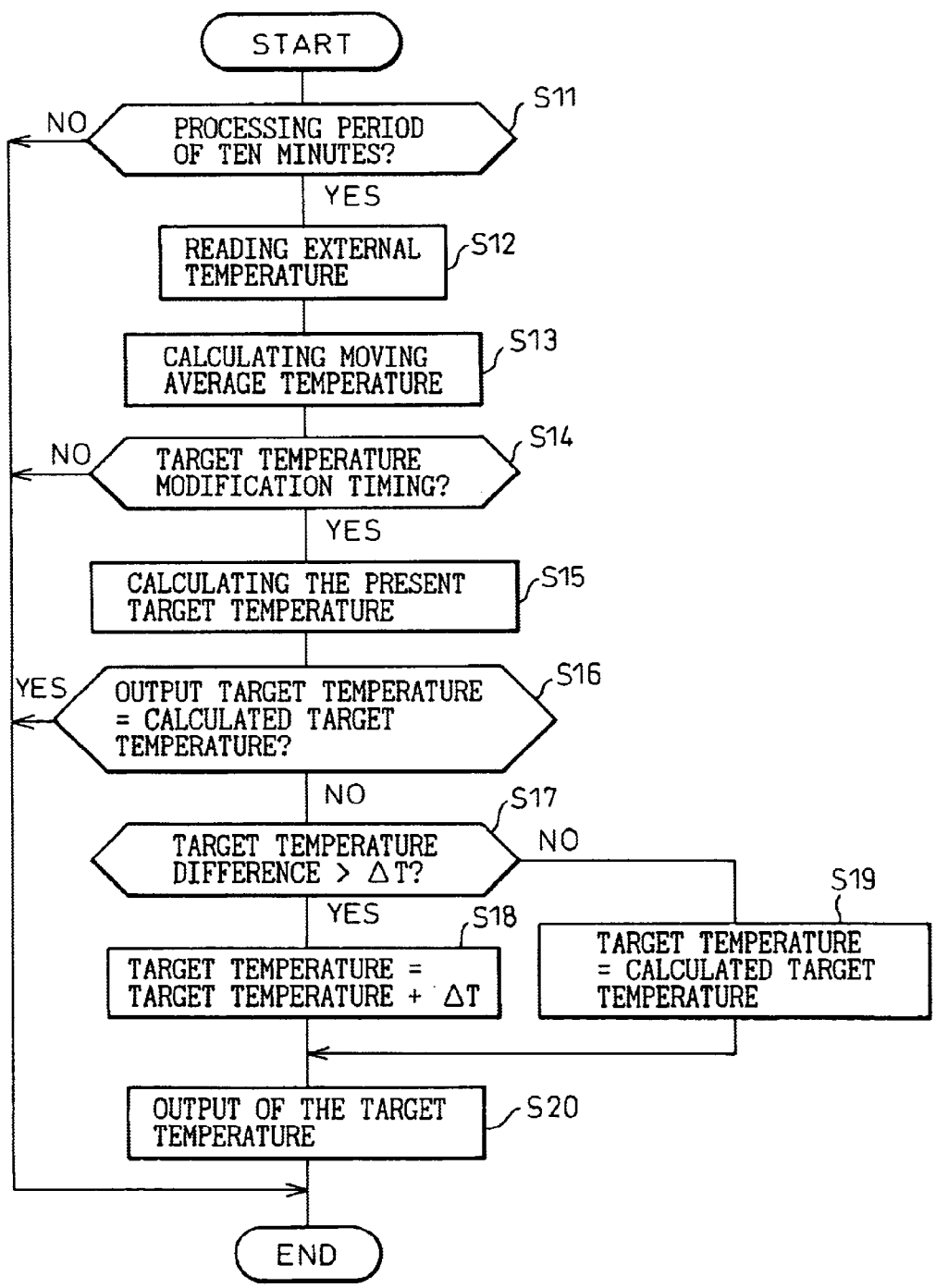

PROCESSING MACHINE INSTALLATION

BACKGROUND OF THE INVENTION

1. Field of the Invention

The invention relates to a processing machine installation which includes a machine tool such as a machining center, a milling machine, a lathe, a grinding machine, a gear cutting machine and a electric discharge machine or a processing machine, such as a precision processing machine, a fine processing machine, an assembling machine, a picking machine and a laser beam processing machine which are used in the field of, for example production of semiconductors, biotechnologies, or medical industries.

2. Description of the Related Art

Processing machines such as a machine tool is required to remove heat generated in a heating body such as a the spindle head by a coolant supplied therethrough to reducing the thermal deformation thereof. Further, a processing machine is thermally deforms by the changes in the ambient temperature. The degree of the thermal deformation changes with the passage of time due to the changes in the ambient temperature, which further adversely effects on the accuracy of machining a workpiece. In order to prevent this, in a prior art, methods of dousing an oil on whole of a processing machine or disposing a processing machine in a thermostatic chamber. However, these methods require a large equipment and cost. In this connection, in a conventional thermostatic chamber, there is a temperature differences between higher and lower positions in the chamber. Further, chips which are generated from a process executed by the processing machine and stacked in the chamber or an operator entered the chamber will be a heat source. Therefore, it is not possible to realize a thermostatic chamber in the proper sense.

Japanese Unexamined Utility Model Publication No. 59-183340 (the first prior art), Japanese Examined Utility Model Publication No. 48-27351 (the second prior art) and Japanese Unexamined Patent Publication No. 62-203736 (the third prior art) disclose methods for solving these problems.

In the first prior art, a cover is provided for enclosing whole of a machine tool. An air conditioner maintains the air temperature within the cover to provide a thermostatic chamber.

The second prior art discloses an oil temperature controller which controls the temperature of a lubricating oil circulating through heating portions in a machine tool so that the oil temperature is synchronized with the temperature of a portion of the machine for example a base which does not generate a heat to reduce the thermal deformation of the machine.

In the third prior art, the air within a splashguard which encloses a substantial portion of a machine tool is stirred and replaced with the air outside of the splashguard to reduce the temperature difference between inside and outside of the splashguard.

According to the first prior art, a preparation room, for bring a tool and/or a workpiece into the cover, is not provided so that a door contact directly the outside ambient. When the door is opened, the temperature inside the cover is easily changed. Further, the thermostatic chamber of the first prior art is directed to maintain merely the temperature of the sir inside of the cover and is not directed to level the temperatures of portions of a machine tool. Therefore, the first prior art does not disclose a concept of leveling the temperatures of the portions of a machine by directing air to the machine so that the air is directed to the heat generating portions much more than the non-heat-generating portions on the more air flow is directed, although the first prior art disclose a configuration to supply a temperature controlled air into the chamber.

According to the third prior art, the lubricating oil is circulated through a machine tool to reduce the temperature differences between heat generating portions and non-heat-generating portions. However, portions apart from the lubricating oil passage is not cooled sufficiently. Therefore, the it is not possible to finely level the temperature of whole of the machine tool.

According to the third prior art, the temperature within the splashguard on the forward side of the column is uniformly controlled to the external temperature. However, the temperature on the rear side of the column is not controlled. Therefore, the temperature difference between the forward and rearward sides of the column changes with the passage of time. This will results in thermal deformation of the column. That is, the warpage in the column changes with the passage of time.

Further, the above-described prior arts do not disclose a feature for directing air flows with a various rates to portions of a machine tool to level the temperatures thereof.

SUMMARY OF THE INVENTION

The invention is directed to solve the prior art problems, and to provide a processing machine installation in which a cover enclose a processing machine to define a thermostatic chamber so that the air temperature in the chamber is controlled to a desired temperature to level the temperatures of portions of the processing machine.

Another objective of the present invention is to provide a processing machine installation which is improved to prevent changes in the thermal deformation of the processing machine with the passage of time.

Another objective of the present invention is to provide a processing machine installation which is improved to prevent the thermal deformation of a column of the processing machine on the basis of the temperature difference between the forward and rearward of the column.

Another objective of the present invention is to provide a processing machine installation which can change the air temperature inside of an air conditioned room defined by a cover for enclosing the processing machine depending on the external temperature or the time and/or season.

According to the invention, there is provided a processing machine installation, comprising:

a processing machine having a tool for machining a workpiece, heat-generating potions and non-heat-generating portions;

a first cover for defining a air conditioned processing machine room around the processing machine;

a first air injector including a plurality of air outlet, provided in the first cover, for directing air to the respective portions of the processing machine, the air outlet being distributed depending on the amount of heat generated in the respective portions of the processing machine so that the air flow through the air outlet portions are adjusted to substantially level the temperature of the respective portions of the processing machine;

an air conditioner for controlling the temperature and/or flow rate of the air supplied to the air injector on the basis of the air temperature in the air conditioned processing machine room; and the air temperature in the air conditioned processing machine room being controlled to a desired temperature.

In the invention, the processing machine a system which can machine a workpiece with the tool moving relative to the workpiece. In case of a machining center as an example, whole of the structure including a bed, a table, a column, a spindle head and a spindle. The tool may be moved relative to a workpiece in three orthogonal axes of X-, Y- and Z-axes and/or at least one axis of additional liner U-, V- and W-axes and rotational A-, B- and C-axes.

The first cover may include interior and exterior walls disposed apart from each other to define a space therebetween, the air outlets are defined in the interior wall, the air flowing from the air conditioner to the air outlets through the space between the interior and exterior walls. According to this feature, the air outlets can be easily distributed in the doubled-wall first cover so that the air flow directed to the heat-generating portion of the processing machine is larger than that directed to non-heat-generating portion. Therefore, the temperature of the respective portions of the processing machine is easily leveled. According to the prior art, the processing machine is disposed merely in a thermostatic room. On the other hand, in the present invention, the air is supplied to the air conditioned processing machine room so that so that the larger the heat generation, the more the air flow directed to the heat-generating portion of the processing machine. This feature improves the accuracy of machining.

Further, controlling separately the flow rate of the air supplied to the air conditioned processing machine room and the air conditioned workpiece stocker room allows the air temperature to be maintained appropriately in the air conditioned processing machine room and the air conditioned workpiece stocker room. Keeping the internal air pressure in the air conditioned processing machine room and the air conditioned workpiece stocker room prevent the outside air from entering the rooms.

Further, according to another feature of the invention, there is provided a processing machine installation, comprising:

a processing machine having a tool for machining a workpiece, heat-generating potions and non-heat-generating portions;

a first cover for defining a air conditioned processing machine room around the processing machine;

a splashguard for preventing chips generated during the process executed on the workpiece, the splashguard having a movable guard, and the splashguard defining a space for machining around the processing machine in the air conditioned processing machine room to prevent the outside air from entering the air conditioned processing machine room when the movable guard is opened;

a chip remover for drawing chips generated during the process executed on the workpiece to the outside of the air conditioned processing machine room with the air inside of the splashguard;

a workpiece stocker, disposed adjacent the processing machine, for storing a workpiece to be automatically changed with the workpiece mounted on the processing machine;

a second cover for defining a air conditioned workpiece stocker room around the workpiece stocker;

a first air injector including a plurality of air outlet, provided in the cover, for directing air to the respective portions of the processing machine, the air outlet being distributed depending on the amount of heat generated in the respective portions of the processing machine so that the air flow through the air outlet portions are adjusted to substantially level the temperature of the respective portions of the processing machine;

an air conditioner for controlling the temperature and/or flow rate of the air supplied to the air injector on the basis of the air temperature in the air conditioned processing machine room; and the air temperature in the air conditioned processing machine room being controlled to a desired temperature.

Further, according to another feature of the invention, there is provided a processing machine installation, comprising:

a processing machine including a bed, a table, provided on the bed, for mounting a workpiece, a column provided on the bed behind the table and a spindle head, provided on the column, for rotationally supporting a spindle;

a splashguard for preventing chips generated during the process executed on the workpiece, the splashguard defining a space for machining around the processing machine;

a cover, provided on the rear side of the column, for defining a column rear side room; and an air supplying apparatus for supplying air so that the air temperature in the machining room and the column rear side room is substantially equal.

DESCRIPTION OF THE DRAWINGS

FIG. 10 is a flowchart showing an algorithm for executing the second method for setting the target temperature.

DESCRIPTION OF THE PREFERRED EMBODIMENTS

Figure 1:
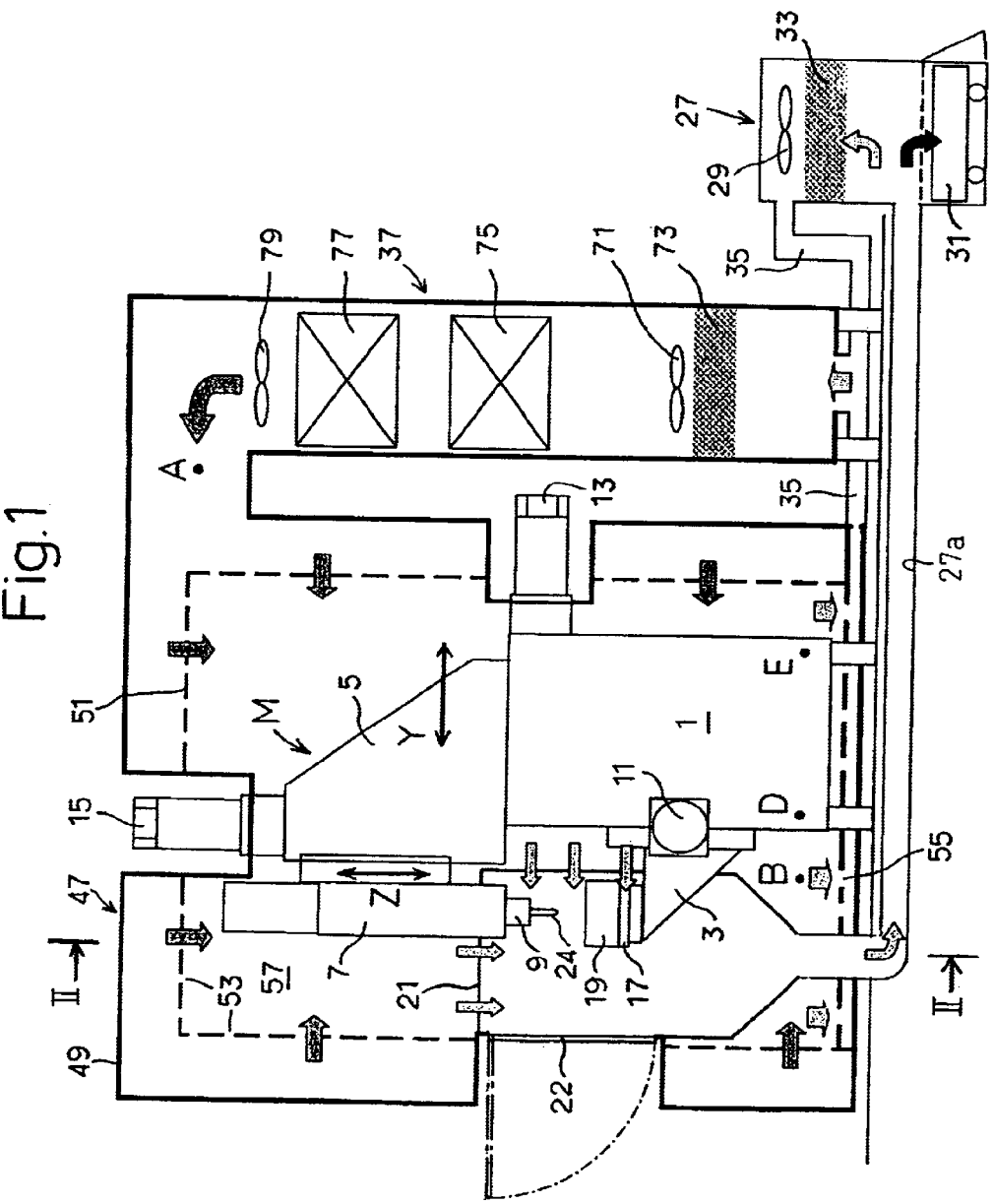
FIG. 1 is a side section shown from right side of a processing machine installation according to an embodiment of the invention.

Various embodiments of the invention will be described hereinafter with reference to the drawings. In the following description, orientations such as right, left, up and/or down are defined in the drawings and are not intended to limit the invention.

Figure 2:
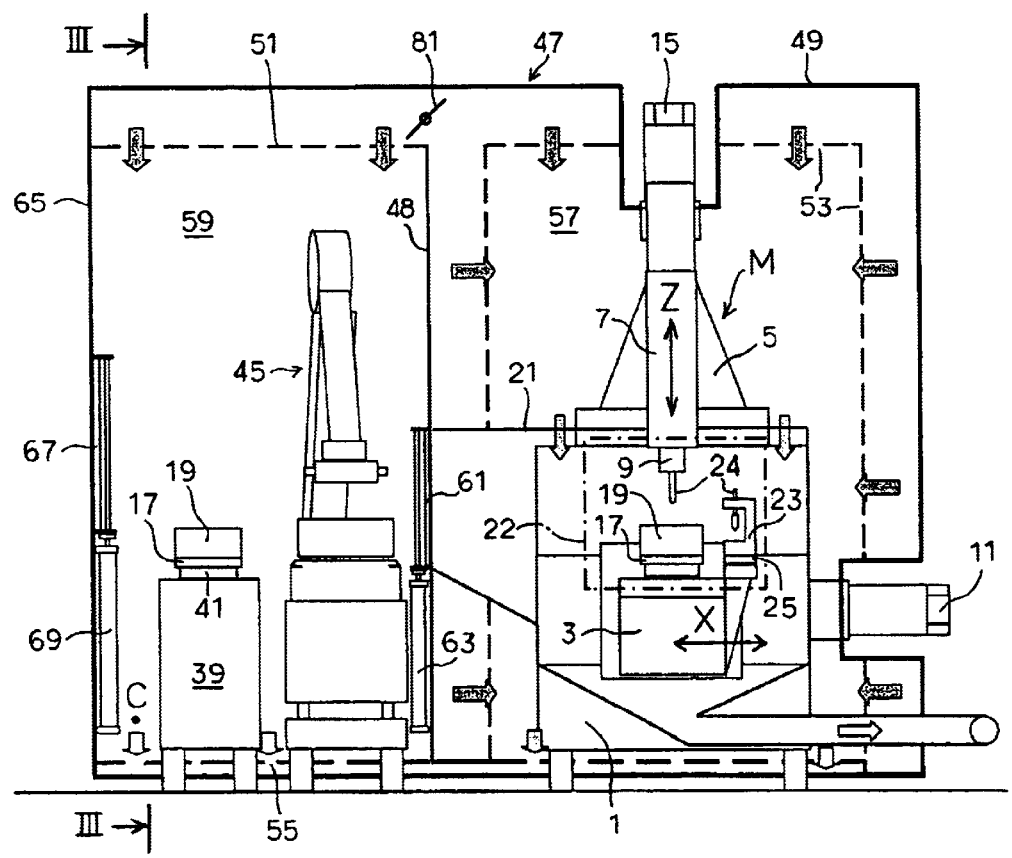
FIG. 2 is a section along II—II in FIG. 1 showing the front side of the processing machine installation.
Figure 3:
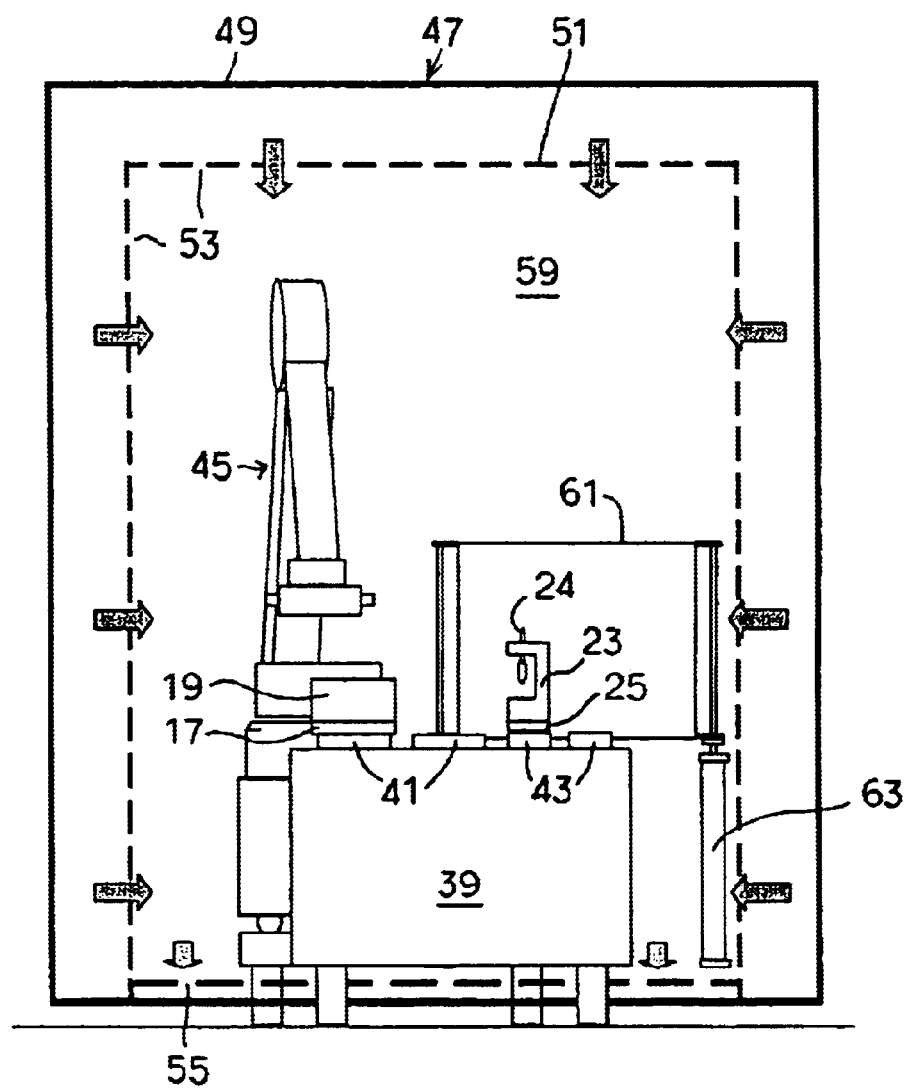
FIG. 3 is a section along III—III in FIG. 2 showing the left side of a preparation room.

With reference to FIGS. 1–3, a first embodiment of the invention will be described.

A machine tool M includes a bed 1 secured to a floor, a table 3 horizontally movable in the direction of X-axis on the bed 1, a column 5 horizontally movable in the direction of Y-axis on the bed 1, a spindle head 7 vertically movable along the front face of the column 5 in the direction of Z-axis. The spindle head 7 houses a vertical spindle 9. On the right side of the bed 1, an X-axis motor 11 is provided. On the rear side of the bed 1, an Y-axis motor 13 is provided. On the top of the column 5, a Z-axis motor 15 is provided. A workpiece 19 is mounted onto a table by a workpiece pallet 17. A tool 24 is mounted to the lower end of the spindle 9 to machine the workpiece 19 with the tool moving relatively to the workpiece in the directions of X-, Y- and Z-axes.

A tool magazine 23 is mounted to the right side wall of the table 3 through a magazine pallet 25. A plurality of the tools 24 are vertically oriented and held by the tool magazine 23. One of the tools 24 is automatically selectively changed with one mounted to the spindle 9.

A splashguard 21 encloses the table 3 and the spindle 9 to prevent chips and machining fluid from spreading out. The chips generated when the workpiece 19 is machined falls below the splashguard 21 to be pneumatically drawn through a chip duct 27a by an induced draft fan 29 provided in a chip remover 27 disposed outside of the splashguard. A chip receiver 31, provided in the chip remover 27, receives the chips which has been pneumatically transported. A filter 33 separates the machining fluid mist contained in the carrier air, which is returned to an air conditioner 37 through an air return duct 35. Although the chip remover 27 is shown at the rear side of the air conditioner 37 in FIG. 1, it may be disposed adjacent the splashguard 21 so that an inclined short chip duct (not shown) connects it to the splashguard 21. Further, in FIG. 1, the carrier air is returned to the air conditioner 37. However, the air used for pneumatically transporting the chip may be exhausted from the chip remover 27 to the ambient through the filter 33. The machining fluid separated from the air by the filter 33 may be collected into the chip receiver 31, in which the fluid may be further separated from the chips to recover the fluid to a machining fluid source (not shown) for reuse. The chip remover may comprise any type of apparatus known in the art such as a lift-up conveyer, a screw conveyer or scraper conveyer.

A stocker 39 is disposed on the left side of the machine tool M. Two sets of workpiece pallet bases 41 and magazine pallet base 43, for the workpiece pallet 17 and the magazine pallet 25, are disposed on the stocker 39. A robot 45 is provided between the splashguard 21 and the stocker 39 for automatically changing the workpiece pallet 17, to which the workpiece 19 is mounted, between the table 3 of the machine tool M and the workpiece pallet base 41 of the stocker 39 and the magazine pallet 25 mounting the tool magazine 23 between the right half portion of the table 3 of the machine tool and the magazine pallet base 43 of the stocker 39.

A cover 47 encloses the machine tool M, the stocker 39 and the robot 45 to isolate them from the outside. In this embodiment, the cover comprises exterior and interior walls 49 and 51 to constitute a doubled-wall cover. The interior wall 51 includes a plurality of air outlets 53. The air conditioner 37 is fluidly connected to the inside of the interior wall 49 through the air return duct 35, a space between the bottom of the interior and the exterior walls 49 and 51 and openings 55 provided in the bottom of the interior wall 49 to draw the air inside of the interior wall 49. In this embodiment, the air inside of the cover 47 is returned to the air conditioner 37. This saves the energy consumption of the air conditioner 37. However, the air may be exhausted to the ambient. In this case, the air return duct 35 can be omitted.

The X-axis motor 11, the Y-axis motor 13 and the Z-axis motor 15 are disposed outside of the cover 47, since they generates heat. A movable cover (not shown), such as a telescopic cover having a stroke corresponding to the stroke of Y-axis, is provided around the Z-axis motor 15, since the Z-axis motor 15 moves in the direction of Y-axis.

A partition wall 48 is provided to divide the inner volume of the cover 47 into a machine room 57 and a workpiece preparation room 59. The partition wall 48 may provide a portion of the side wall of the splashguard 21. The machine room 57 provides the air conditioned process machine room described in the claims. The preparation room 59 provides the air conditioned workpiece stocker room described in the claims. A vertically movable inner door 61 is provided on the left side wall of the splashguard 21. An actuator 63 is provided to open and close the door 61. The inner door 61 is closed except when the workpiece pallet 17 and/or the magazine pallet 25 are changed. The inner door 61 may be arranged to rotate to open to the machine room 57 or the preparation room 59.

A left side wall 65 of the preparation room 59 includes a vertically movable outer door 67. An actuator 69 is provided to open and close the door 67. The outer door 67 is closed except when a machined workpiece on the stocker 39 is removed and a new workpiece is supplied to the stocker 39 and the tools held by the tool magazine 23 on the stocker 39 are changed.

The air conditioner 37 includes an induced draft fan 71 for drawing the air in the machine room 57 and the preparation room 59 through the air return duct 35, a filter 73, a cooler 75 for cooling the air, a heater 77 for heating the air and a forced draft fan 79 for the air, which is adjusted to a desired temperature, to the machine room 57 and the preparation room 59. The forced draft fan 79 is of a type of variable speed. The rotational speed of the forced draft fan 79 is controlled to maintain the air pressure in the machine room 57 and the preparation room 59 higher than the external air pressure (the atmospheric pressure). Further, the forced draft fan 79 is operated for a temperature control described hereinafter. The air leakage due to the air pressure of the machine room which is higher than the external pressure is compensated by drawing the outside air through the induced draft fan 29.

In this embodiment, an air flow adjusting valve 81 is provided between the machine room 57 and the preparation room 59 for controlling the air flow supplied to the preparation room 59. The respective controls of the air flow adjusting valve 81, the induced draft fan 71 of the air conditioner 37, the cooler 75, the heater 77 and the forced draft fan 79 are controlled by a controller (not shown).

Further, a temperature-controlled coolant can be preferably supplied to the spindle head 7, X-, Y-, and Z-axis ball screws which generate much heat. A fluid temperature controller can be preferably provided in a machining fluid circulating system to cool the machining fluid which has been heated during the machining operation.

The air temperature is adjusted to a predetermined temperature by the air conditioner 37 and is directed to the machine room 57 and the preparation room 59 through the air outlets 53 provided in the interior wall 51, as shown in the arrows in the drawings. Thereafter, the air is recovered to the air conditioner 37 through the openings 55 provided in the bottom of the interior wall 51. In this connection, a portion of the air supplied to the machine room 57 flows inside the splashguard 21, as shown in the arrows in the drawings, through gaps in the is form of louvers provided in the splashguard. The air flowing inside the splashguard 21 is drawn with the chips by the chips remover 27.

In this embodiment, around the spindle head 7, X-, Y-, and Z-axis motors 11, 13 and 15 and a return conduit (not shown) for recovering the used machining fluid, the outer door 67 of the preparation room 59 through which the outside air flows into the cover where heat generation is occurred, the number of the air outlets 53 provided in the interior wall 51 is larger than that of the air outlets 53 provided in the interior wall 51 around the rear side and lower portion of the machine tool M, the lower portion of the preparation room 59 where the heat is not generated. This leads substantially the uniform temperature of the portions of the machine tool and prevent the changes in the temperature with the passage of time.

In the above-described embodiment, the air flow is adjusted depending on the position in the interior wall 51 by altering the number of the air outlets 53 in the design phase. However, the invention is not limited to this embodiment. The interior wall 51 may include the air outlets 53 which have the same size and are disposed at even an pitch, a portion of the air outlets 53 being plugged to reduce the air flow. Further, a plate member, which includes holes corresponding to the air outlets 53, may be provided to slide along the surface of the interior wall 51 to alter the air flow depending on the degree of opening defined by the air outlets 53 and the holes overlapped to each other.

A temperature sensor A is provided to measure the temperature of the air from the air conditioner 37. A temperature sensor B is provided to measure the temperature of the air returned from the machine room 57. A temperature sensor C is provided to measure the temperature of the air returned from the preparation room 59. A temperature sensors D and E are provided to measure the temperatures of the front and rear sides of the bed 1.

The air conditioner 37 is primarily operated by on-off control of the cooler and the heater so that the temperature sensed by the temperature sensor A falls within a predetermined range. When the outer door 67 is opened and the temperature sensed by the temperature sensor C exceeds a allowable range, the rotational speed of the forced draft fan 79 is increased and/or the degree of opening of the air flow adjusting valve 81 is increased to increase the air flow into the preparation room 59. This allows the temperature in the preparation room 59 to return to the predetermined temperature quickly so that the temperature of the workpiece and tool to quickly comply with the predetermined temperature. The air flow into the preparation room 59 may be increased compared with that into the machine room 57, because of the inflow and outflow into and from the preparation room 59.

In the usual operation, the temperature and/or the flow rate of the air from the air conditioner 37 is controlled so that the temperature difference sensed by the temperature sensors A and B falls within a predetermined range. However, the temperature difference exceeds the range, an abnormal operation is determined to stop the machining operation. Further, the machining operation may also be stopped when a temperature difference between the portions of the machine tool is determined for example by the temperature sensors D and E.

The workpiece 19 and/or the tool 24 which have been transported in the preparation room 59 can be transported into the machine tool M when the temperature sensed by the temperature sensor C falls within a predetermined range and the time elapse from the transportation of the workpiece and/or the tool into the preparation room reaches a predetermined value. The temperature of the workpiece and tool may be sensed by a non-contact type temperature sensor to determine if the sensed temperature falls within the predetermined range instead of measuring the time elapse.

An interlock (not shown) may be provided to inhibit the inner door 61 to open when the outer door 67 is opened to prevent the outside air from entering the machine room 57. Maintaining the air pressure in the machine room 57 and the preparation room 59 prevents the inflow of the outside air to ensure thermostatic condition within the machine room 57 and the preparation room 59.

Although, in this embodiment, the preparation room 59 serves as a common preparation room for the workpiece and tool, and the preparation room, separate preparation rooms may be provided. An example may be conceived which includes an automatic pallet changing arm provided on the left side of the machine tool M instead of the robot 45, a pallet magazine provided instead of the stocker 39, and a workpiece preparation room defined by a cover enclosing the automatic pallet changing arm and the pallet magazine. In this configuration, a tool magazine may be disposed on the right side of the machine tool M so that tools are exchanged between the spindle and the tool magazine by an ATC (Automatic Tool Changer) arm. The tool magazine and the ATC arm may be enclosed by a cover to provide a tool preparation room. Further example may be conceived in which only a preparation room for the workpiece is provided and a preparation room is omitted if the thermal deformation of the tools can be neglected.

In the above-described embodiment, the air outlets 53 are provided in the ceiling and the side walls of the interior wall 51 and the air is returned to the air conditioner through the openings 55 provided in the bottom of the interior wall 51. The air outlet 53 may be provided in the ceiling or the side walls of the interior wall 51. Further, the air may be supplied through air outlet provided in only the ceiling of the interior wall 51 and drawn through openings provided in the side walls of the interior wall 51. Drawing the air from the machine room 57 and the preparation room 59 can also induce an air flow in the rooms 57 and 59.

In the above-described embodiment, the exterior wall 49 preferably comprises a thermal insulating material. This reduces changes in the temperature of the air flowing inside of the exterior wall 49. Further, the exterior wall 49 may comprise a double wall constitution including an air layer to obtain the thermal insulation effect as in the feature having a thermal insulating material.

A single layer cover comprising a thermal insulating material, instead of the double wall configuration of the exterior wall 49 and the interior wall 51, may define the machine room 57 and the preparation room 59. In this case, a conduit system may be provided around the machine tool M, the stocker 39 and the robot 45 to deliver the air, which may be directed to through a plurality of nozzles connected to the conduit system. Further, the single layer cover is disposed apart from the machine tool M and the stocker 39 spacers of a thermal insulating material allows the single layer cover to be attached to the machine tool M and/or the stocker 39 without heat transfer therebetween.

A movable guard 22, for the access to the inside of the splashguard 21, may be provided on the front side of the splashguard 21. Opening the movable guard 22 allows an operator to bring a workpiece to the table 3, to check the condition of the machining or the condition of wear in the tool with the machine tool M stopped or to execute a maintenance of the machine tool M. If the guard 22 is opened, the air can only the inside of the splashguard 21 and cannot enter the machine room 57. The air entered inside of the splashguard 21 is quickly drawn by the chip remover 27 when the movable guard 22 is closed so that the temperature of the machine tool M is not substantially changed. The movable guard 22 may comprise a plate member attached to the splashguard 21 by a hinge or bolts.

The invention can also be applied to a configuration without a preparation room. Such a configuration may not include the stocker 39, the robot 45 and/or the preparation room 59 or may comprises a single layer cover encloses the machine tool M, the stocker 39 the robot 45 without the partition wall 48 so that a preparation room is omitted. The splashguard 21 and the movable guard 22 can be provided in the configuration without the preparation room further, the air return duct 35 can also be provided for drawing the air to the air conditioner 37.

In the above-described embodiment, the temperature-controlled air is delivered through the exterior and interior walls 49 and 41 and supplied to the rooms 57 and 59 through the air outlets 53 provided in the interior wall 51. However, the temperature-controlled air can be supplied to the machine room 57 and the preparation room 59 from the air conditioner 37 through a conduit system provided in the rooms 57 and 59 and nozzles connected to the conduit system.

In the above-described embodiment, the machine tool M is a machining center having an automatic tool changer. According to the invention, the machining center can be replaced with a processing machine, such as a precision processing machine, a fine processing machine, an assembling machine, a picking machine and a laser beam processing machine which are used in the field of, for example production of semiconductors, biotechnologies, or medical industries which is enclosed by the cover to maintain the inside thereof at a thermostatic condition. In this case, it is conceivable if the preparation room 59 for the workpiece may be provided or not.

Figure 4:
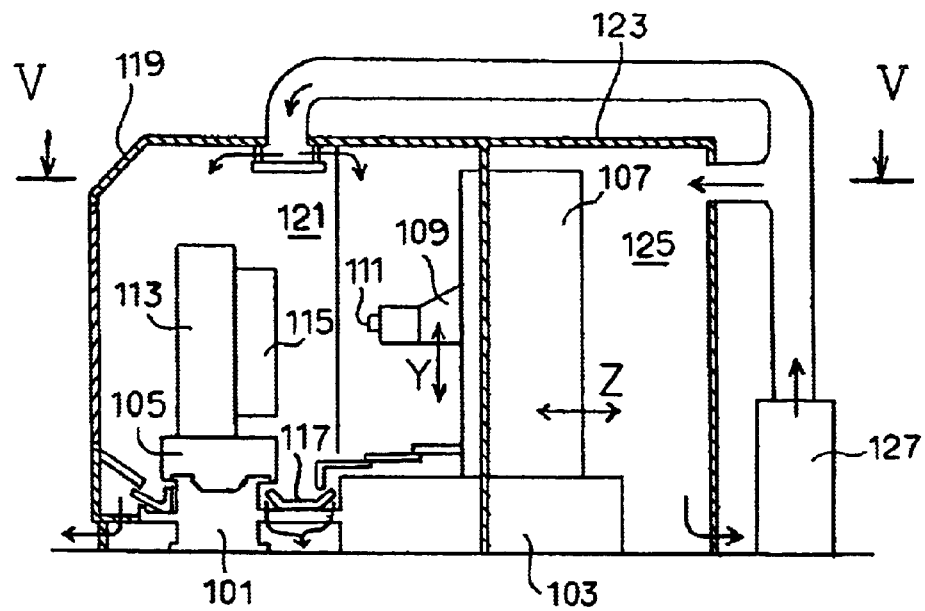
FIG. 4 is a side section of a processing machine installation according to another embodiment of the invention.
Figure 5:
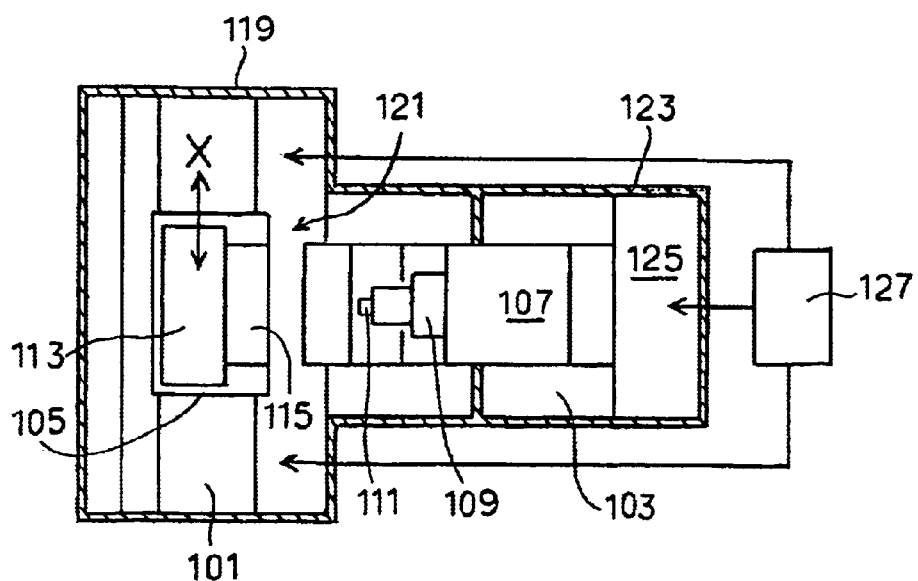
FIG. 5 is a section along V—V in FIG. 4 showing the top of the processing machine installation.

Another embodiment of the invention will be described with reference to FIGS. 4 and 5.

The machine tool includes a bed composed of front and rear beds 101 and 103 which are secured to a floor, a table 105 movable in the direction of X-axis on the front bed 101, a column 107 movable in the direction of Z-axis on the rear bed 103, a spindle head 109 vertically movable in the direction of Y-axis on the front face of the column 107. The spindle head 109 houses a horizontal spindle 111. A fixing member 113 is mounted to the table 105. A workpiece 115 is secured to a vertical face of the fixing member 113. The workpiece 115 is machined by a toll mounted to the distal end of the spindle 111 which is moved relative to the workpiece 115 in the directions of X-, Y- and Z-axes. The chips generated when the workpiece 115 is machined falls into a trough 117 and is removed by a chip remover (not shown) to the outside of the machine together with the machining fluid.

The space for machining, in which the table 105 and the spindle head 109 are disposed, is enclosed by a splashguard 119 defining a machining room 121. The rear side of the column 107 is enclosed by a rear cover 123 defining a column rear side room 125. The cover positioned between the machining room 121 and the column rear side room 125 has sealing members provided for slide relative to the top and side faces of the column 107.

A blower 127 is provided for supplying the air to the machining room 121 and the column rear side room 125 at the same temperature. The air supplied to the machining room 121 and the column rear side room 125 is discharged to the outside through holes provided in the lower portions of the machining room 121 and the column rear side room 125. This configuration makes the temperature of the front and rear faces of the column equal to remove deformation of the column due to the temperature difference therebetween. In this embodiment, since the heat generation in and the volume of the machining room 121 is larger than those in and of the column rear side room 125, the air flow rate into the machining room 121 is preferably higher than the flow rate into the column rear side room 125 so that to maintain substantially the same air temperature in the machining room 121 and the column rear side room 125.

Provision of an air conditioner, for distributing air which temperature is adjusted to a predetermined temperature, instead of the blower 127 can realize a thermostatic condition in the machining room 121 and the column rear side room 125 of the same temperature. This removes changes in the thermal deformation of the column 107. In the case employing the air conditioner, it is preferable to circulate the air between the rooms 121 and room 125 and the air conditioner through an air return duct (not shown) connecting them. In this embodiment, the air flow rate into the machining room 121 is preferably higher than the flow rate into the column rear side room 125 so that to maintain substantially the same air temperature in the machining room 121 and the column rear side room 125. The air temperature for the machining room 122 may be lower than that into the room 125.

In general, a machine tool is provided with a splashguard 119, therefore, provision of the column rear cover 123 and the blower 127 or the air conditioner realizes an apparatus for preventing the thermal deformation of the machine tool of the invention.

With reference to FIGS. 6–10, a method of setting a target temperature for the air conditioner 37 of the first embodiment and an air conditioner of the second embodiment will be described below. Hereinafter, the method will be described relative to the air conditioner 37 of the first embodiment. Is should be understand that the same method can be applied to the air conditioner of the second embodiment.

Figure 6:
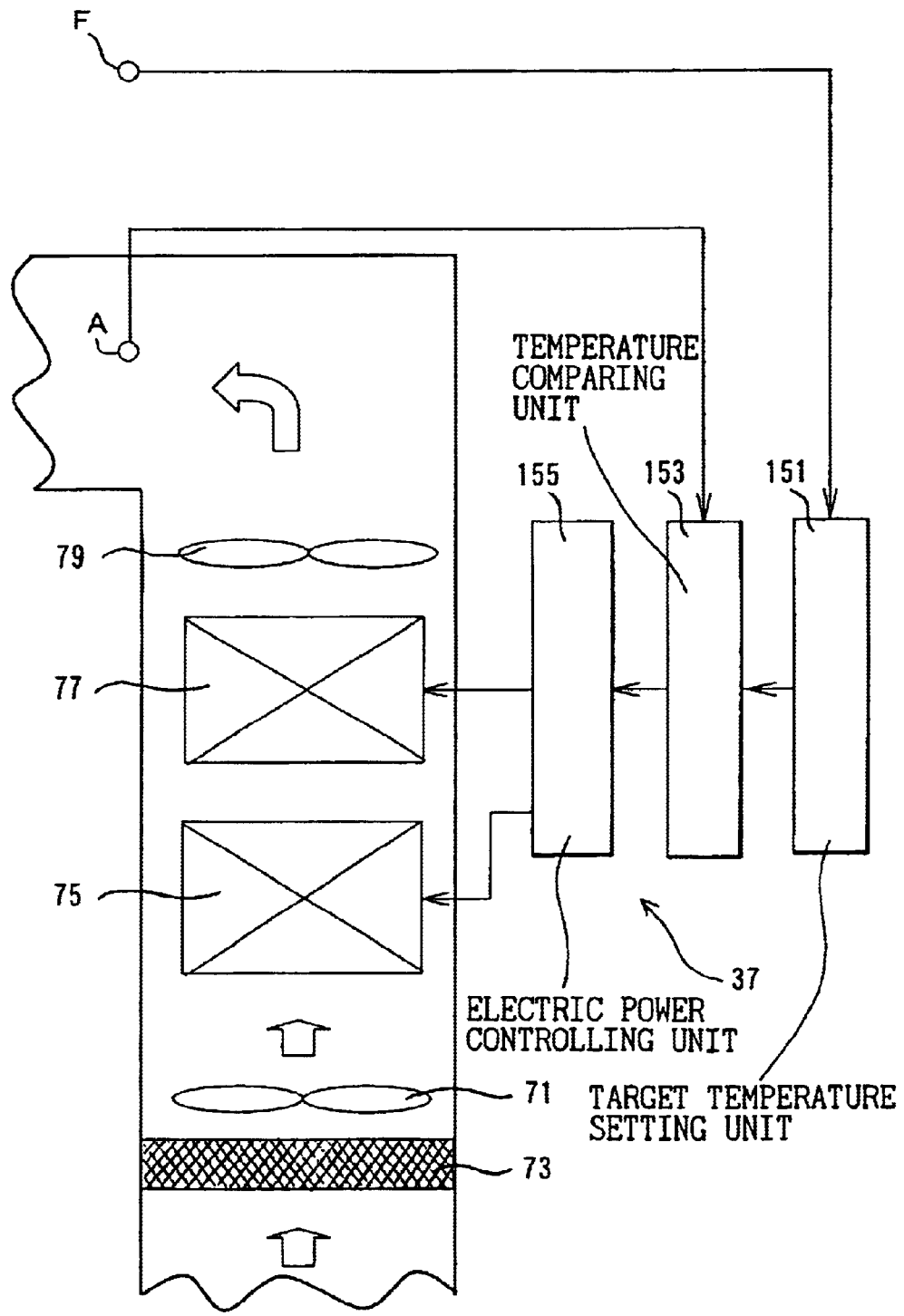
FIG. 6 is a block diagram of an air conditioner shown in FIG. 1.

With reference to FIG. 6, a block diagram of the air conditioner 37 is shown. The cooler 75 and the heater 77 are operated to maintain the temperature sensed by the temperature sensor A to a target temperature set by a target temperature setting unit 151. A temperature comparing unit 153 compares the target temperature output by the target temperature setting unit 151 and the temperature sensed by the temperature sensor A to send an instruction for the operation of the cooler 75 and/or the heater 77 to an electric power supply controlling unit 155 on the basis of the comparison result. The target temperature may be set to a yearly constant value. The target temperature is, however, preferably modified gradually, depending on the external temperature, so that the accuracy of machining is deteriorated. The larger the temperature difference between the external air temperature and the air temperature in the machine room 57 and the preparation room 59, the larger the energy consumption required for the air conditioner and/or the longer the time required to change the air temperature in the preparation room 59 to the predetermined temperature. Modification of the target temperature solves these problems. For example, the target temperature is preferably modified in case that relatively large changes in the external temperature are occurred in a day, there is a sudden cold or hot day at a break of season or the seasonal temperature difference between summer and winter is relatively large. Although an operator can modify the target temperature on the basis of his sense and experiences, the target temperature is preferably automatically modified along an algorism.

Figure 7:
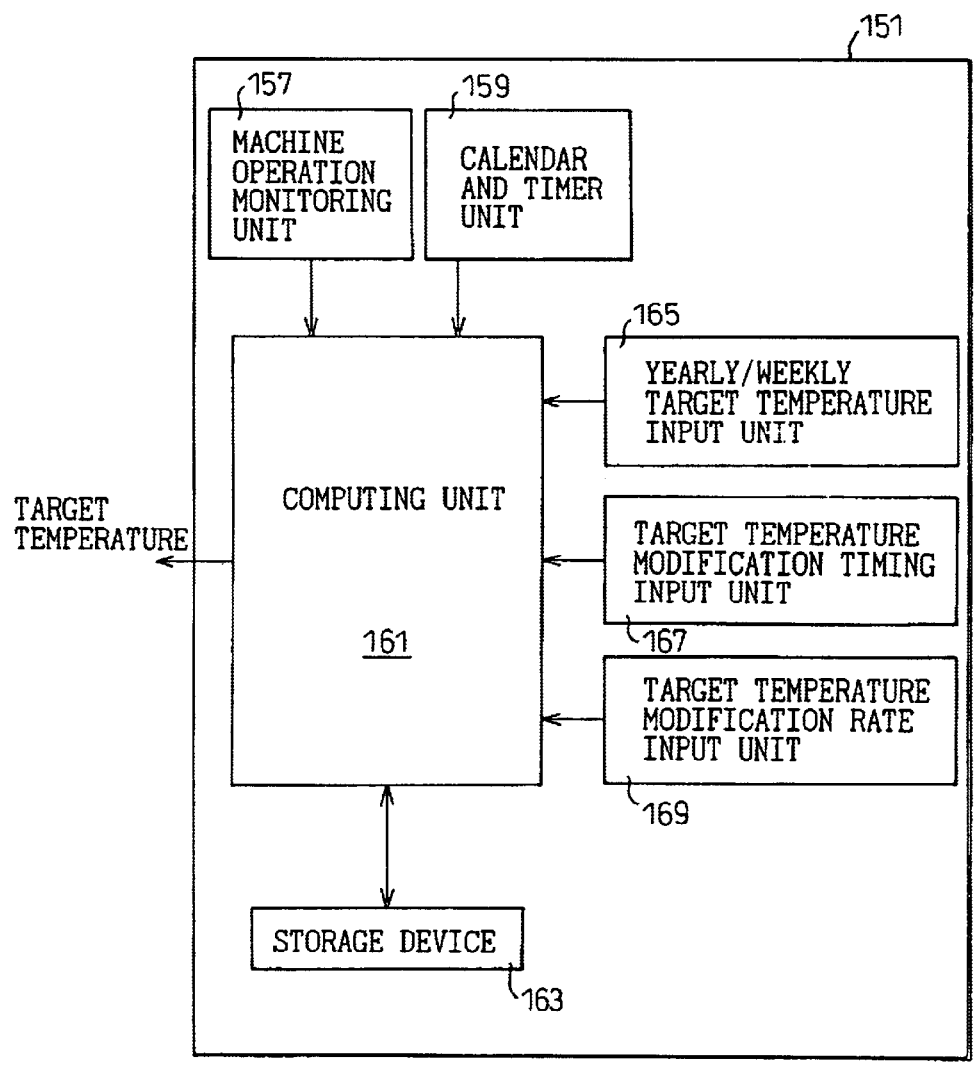
FIG. 7 is a block diagram of a target temperature setting unit adapted to a first method for setting a target temperature.
Figure 8:
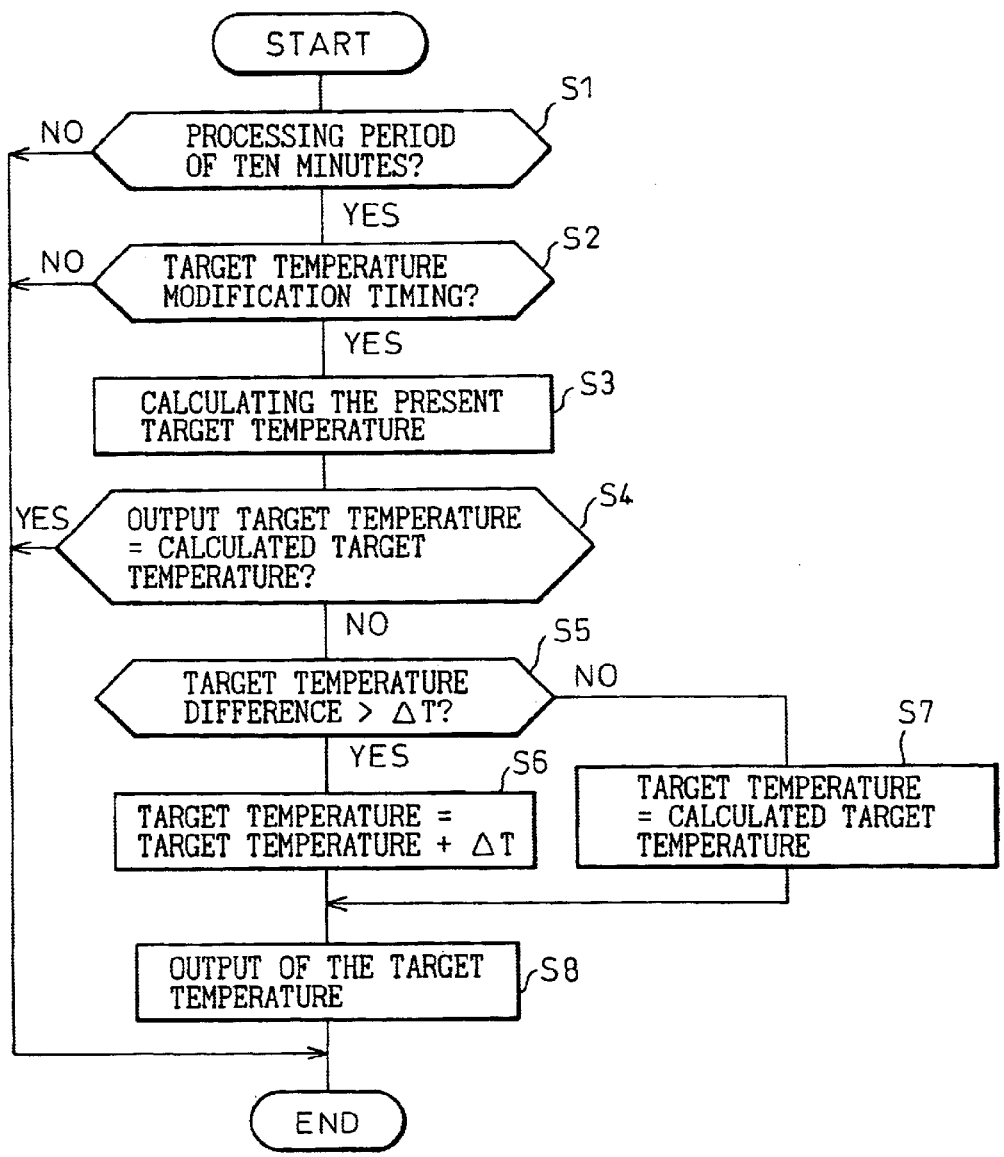
FIG. 8 is a flowchart showing an algorithm for executing the first method for setting the target temperature.

A first method of setting the target temperature will be described with reference to FIGS. 7 and 8.

Yearly/weekly target temperatures are input through a yearly/weekly target temperature input unit 165 and stored in a storage device 163. The Yearly/weekly target temperatures can be stored as a function designating a curve between representative temperatures for winter (for example 18 Celsius degrees) and summer (for example 28 Celsius degrees). A target temperature modification timing, for example weekend (Saturday or Sunday) or nighttime of a weekday selected in consideration of the operation time of the machine tool, is input through a target temperature modification timing input unit 167 and stored it in the storing unit 163. Changing rate for the target temperature, determined in consideration of the temperature compliance of the machine tool M, for example 0.1 Celsius degree/hour, is input through a target temperature modification rate input unit 169 and is stored in the storage device 163. These values input may be previously incorporated with the storage device 163 in the form of a ROM.

In this embodiment, a computing unit 161 executes the calculation of the target temperature at the predetermined period of ten minutes to output the temperature. That is, in step S1, the elapse of the processing period is determined whether if it has passed ten minutes or not. If it has passed ten minutes (YES in step S1), the process will be proceeded to step S2, in which it is determined whether it is the time for changing the target temperature or not by comparing the present time obtained from the calendar and timer unit 159 and the timing for changing the target temperature previously stored in the storage device 163. If it is not so (NO in step S2), the process will be ended without calculating the target temperature. If it is so (YES in step S2), the present target temperature is calculated based on the yearly and weekly target temperature which is previously stored (step S3). In step S4, the present target temperature which is presently output and the calculated target temperature which has been calculated in step S3 are compared with each other. If they are the same (YES in step S4), the process is ended. If they are different from each other (NO in step S4), the process will be proceeded to step S5. In step S5, the difference between the present target temperature and the calculated target temperature is compared with ΔT which corresponds to the target temperature modification rate for the processing period of ten minutes, stored in the storage device 163 if the difference between the present target temperature and the calculated target (YES in step S5), the process will be proceeded to step S6. If it is small (NO in step S5), the process will be proceeded to step S7. For example, If the target temperature modification rate is 0.1 Celsius degrees/hour, ΔT is 0.1/6 Celsius degrees corresponding to the rate for ten minutes. In step S6, a new target temperature is calculated by adding ΔT to the target temperature, and it is output in step S8. This gradual modification of the target temperature prevents the changes in the target temperature from adversely effecting on the accuracy of machining. In step S7, a new target temperature is replaced with the target temperature calculated in step S3, which is output in step S8. The target temperature is determined through the above-described algorism and output from the target temperature setting unit 151. A machine operation monitoring unit 157 is provided for preventing the calculation of the target temperature when the machine is in operation. Because it is not preferable to modify the target temperature when the machine tool is in operation.

Figure 9:
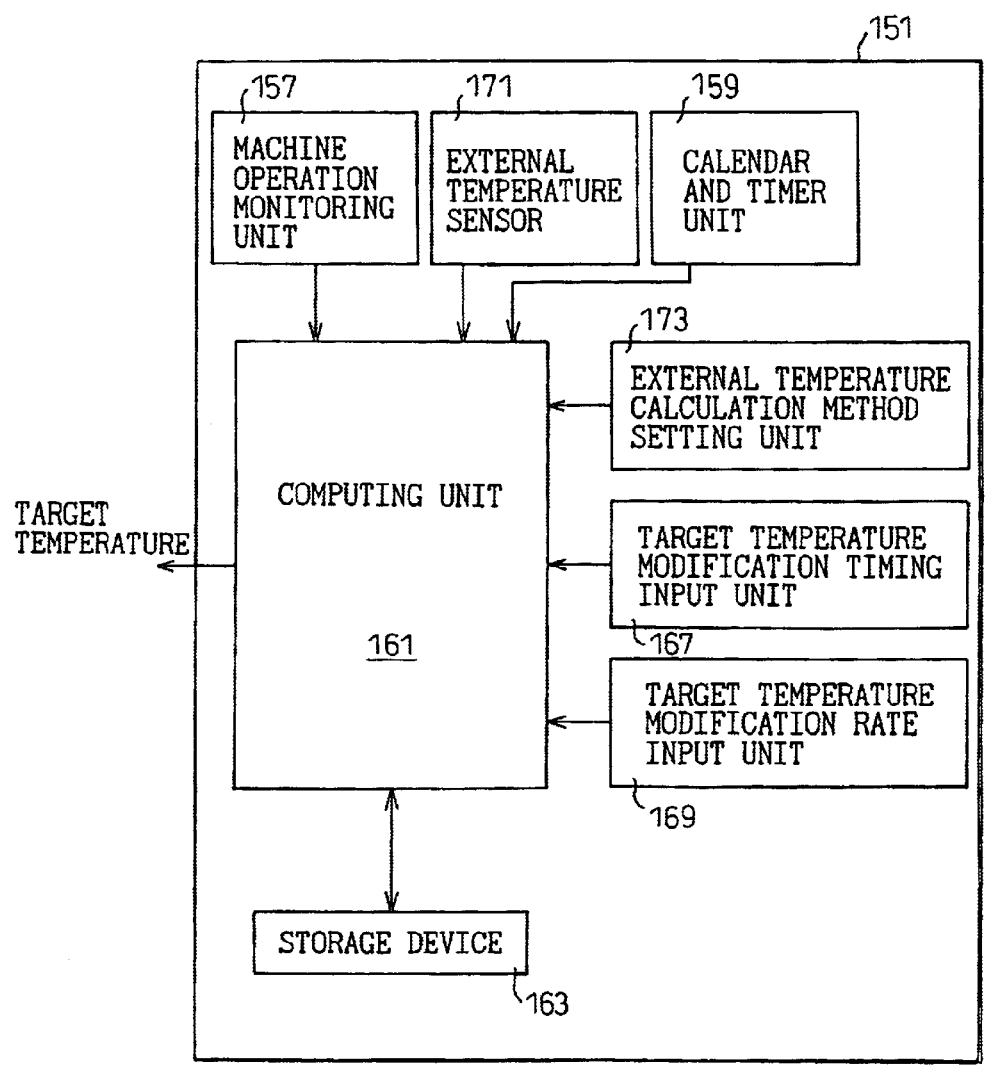
FIG. 9 is a block diagram of a target temperature setting unit adapted to a second method for setting a target temperature.

With reference to FIGS. 9 and 10, a second method of setting the target temperature will be described. FIG. 9 is a block diagram of the target temperature setting unit 151 which realize the method of setting the second target temperature. FIG. 10 is a flow chart showing the operation of the computing unit 161. In FIGS. 7 and 8, identical elements are indicated by the same reference numbers.

An external temperature calculation method setting unit 173 is provided for setting a method for calculating the temperature, for example a method for calculating moving average of the temperatures for three days or method of calculating root-mean-square value of the temperatures for five days. The method thus set is stored in the storage device 163.

The operation in step S11 is the same as in step S1. If in step S12, the present time read from the calendar and timer unit 159 is the time for calculating the external air temperature, the external air temperature is sensed by a temperature sensor F through an external temperature sensor 171. In step 513, for example, moving average of the external air temperatures for three days is calculated. The operation in step S14 is the same as in step S2. In step S15, a present target temperature is calculated by the set method, i.e., the equation of the moving average method. The respective operations from step S16 through step 20 are omitted since they are the same as those of above-described steps S4–S8.

As described above, according to the first method for setting the target temperature, the yearly or weekly changes in the external air temperature can be predicted and the mean value thereof is used. According to the second method for setting the target temperature, the external air temperature is read at a predetermined sampling period to calculate the mean value thereof so that a gradually altering temperature pattern is prepared for use in the modification of the target temperature. This embodiment is useful, in particular, when the external air temperature unexpectedly changes in a day or days.

It will also be understood by those skilled in the art that the forgoing description is a preferred embodiment of the disclosed device and that various changes and modifications may be made without departing from the spirit and scope of the invention.

What is claimed is:

1. A processing machine installation, comprising:
   a processing machine having a tool for machining a workpiece, heat-generating portions and non-heat-generating portions;
   a first cover for defining a air conditioned processing machine room around the processing machine, the first cover including interior and exterior walls disposed apart from each other to define a space therebetween;
   a first air injector including a plurality of air outlets, provided in the interior wall of the first cover, for directing air to the respective portions of the processing machine, the air outlet being distributed depending on the amount of heat generated in the respective portions of the processing machine so that the air flow through the air outlet portions are adjusted to substantially level the temperature of the respective portions of the processing machine;

an air conditioner for controlling at least one of the temperature and flow rate of the air supplied to the air injector on the basis of the air temperature in the air conditioned processing machine room;

the space defined between the interior and exterior walls fluidly connecting the first air injector and the air conditioner to allow the air to flow from the air conditioner into the air conditioned processing machine room through the air injector; and the air temperature in the air conditioned processing machine room being controlled to a desired temperature.

2. A processing machine installation according to claim 1, further comprising a workpiece stocker, disposed adjacent the processing machine, for storing a workpiece to be automatically changed with the workpiece mounted on the processing machine;

a second cover for defining a air conditioned workpiece stocker room around the workpiece stocker; and a door, provided in the second cover, for allowing the workpiece with the workpiece on the workpiece stocker to be changed with the workpiece on the processing machine; and a second air injector including a plurality of air outlets, provided in the second cover, for directing air into the air conditioned workpiece stocker room so that the air temperature in the air conditioned processing machine room and the air conditioned workpiece stocker room is substantially equal to each other.

3. A processing machine installation according to claim 1 or 2 wherein at least one of the first cover defining the air conditioned processing machine room and the second cover defining the air conditioned workpiece stocker room comprises a thermal insulating material.

4. A processing machine installation according to claim 1 or 2 wherein at least one of the first and second covers comprises a single layer cover which is made of a thermal insulating material or has a thermal insulating material attached thereto, and said at least one of the first and second covers is attached to at least one of the processing machine and the workpiece stocker by a spacer therebetween.

5. A processing machine installation according to claim 1 or 2 further comprising a splashguard for preventing chips generated during the process executed on the workpiece, the splashguard having a movable guard, and the splashguard defining a space for machining around the processing machine in the air conditioned processing machine room to prevent the outside air from entering the air conditioned processing machine room when the movable guard is opened.

6. A processing machine installation according to claim 1 or 2 further comprising a chip remover for conveying chips generated during the process executed on the workpiece to the outside of the air conditioned processing machine room.

7. A processing machine installation according to claim 1 or 2 further comprising an air return duct for recovering the air from at least one of the air conditioned processing machine room and the air conditioned workpiece stocker room to the air conditioner.

8. A processing machine installation, comprising:

a processing machine having a tool for machining a workpiece, heat-generating potions and non-heat-generating portions;

a first cover for defining a air conditioned processing machine room around the processing machine, the first cover including interior and exterior walls disposed apart from each other to define a space therebetween;

a splashguard for preventing chips generated during the process executed on the workpiece, the splashguard having a movable guard, and the splashguard defining a space for machining around the processing machine in the air conditioned processing machine room to prevent the outside air from entering the air conditioned processing machine room when the movable guard is opened;

a chip remover for drawing chips generated during the process executed on the workpiece to the outside of the air conditioned processing machine room with the air inside of the splashguard a workpiece stocker, disposed adjacent the processing machine, for storing a workpiece to be automatically changed with the workpiece mounted on the processing machine;

a second cover for defining a air conditioned workpiece stocker room around the workpiece stocker;

a first air injector including a plurality of air outlets, provided in the interior wall of the first cover, for directing air to the respective portions of the processing machine, the air outlet being distributed depending on the amount of heat generated in the respective portions of the processing machine so that the air flow through the air outlet portions are adjusted to substantially level the temperature of the respective portions of the processing machine;

an air conditioner for controlling at least one of the temperature and flow rate of the air supplied to the air injector on the basis of the air temperature in the air conditioned processing machine room;

the space defined between the interior and exterior walls fluidly connecting the first air injector and the air conditioner to allow the air to flow from the air conditioner into the air conditioned processing machine room through the air injector; and the air temperature in the air conditioned processing machine room being controlled to a desired temperature.

9. A processing machine installation according to claim 8 further comprising an air return duct for recovering the air from at least one of the air conditioned processing machine room and the air conditioned workpiece stocker room to the air conditioner.

10. A processing machine installation according to claim 1 or 8 wherein the air temperature in at least one of the air conditioned processing machine room and the air conditioned workpiece stocker room is set on the basis of the outside air temperature, the time or season.

11. A processing machine installation, comprising:

a processing machine including a bed, a table, provided on the bed, for mounting a workpiece, a column provided on the bed behind the table and a spindle head, provided on the column, for rotationally supporting a spindle;

a splashguard for preventing chips generated during the process executed on the workpiece, the splashguard defining a space for machining around the processing machine;

a cover, provided on the rear side of the column, for defining a column rear side room; and an air supplying apparatus for supplying air so that the air temperature in the machining room and the column rear side room is substantially equal, wherein the air supplied by said air supplying apparatus has a temperature that is set on the basis of the outside air temperature, the time or season.

\* \* \* \* \*